United States Patent [19]
Ventress

[11] Patent Number: 5,339,508
[45] Date of Patent: Aug. 23, 1994

[54] APPARATUS FOR WHEEL ALIGNMENT

[76] Inventor: Ray Ventress, 19725 Telegraph Trail, Langley, B.C., Canada, V3A 4P8

[21] Appl. No.: 968,956

[22] Filed: Oct. 30, 1992

Related U.S. Application Data

[63] Continuation-in-part of Ser. No. 727,267, Jun. 26, 1991, abandoned.

[51] Int. Cl.5 .............................................. B25B 27/14
[52] U.S. Cl. ........................................ 29/273; 29/267; 29/252; 72/704; 33/203.18; 33/203.15
[58] Field of Search .................. 29/252, 267, 270, 273; 72/704, 705; 269/130; 254/93 UA, 123; 33/203, 288, 203.18, 203.15, 193

[56] References Cited

U.S. PATENT DOCUMENTS

| | | | |
|---|---|---|---|
| 2,142,850 | 1/1939 | Johnston | 72/704 |
| 4,388,820 | 6/1983 | Rickbeil | 72/704 |
| 4,485,662 | 12/1984 | Justice | 72/704 |
| 4,648,582 | 3/1987 | Grindahl et al. | 269/130 |
| 4,858,298 | 8/1989 | Fleischanderl | 29/273 |

Primary Examiner—Bruce M. Kisliuk
Assistant Examiner—Eileen Morgan

[57] ABSTRACT

Apparatus for vehicle wheel alignment comprising a wheel engaging member and a bearing surface rigidly mountable to the wheel engaging member. A lever with a movable fulcrum is mounted to the bearing surface for applying an appropriately directed force to the bearing surface to adjust the alignment of an engaged wheel. A bracing member is provided extendable from the lever for attachment to an anchor surface. The bracing member provides a reaction force to ensure that the aligning force generated by the lever is directed toward the engaged wheel. Alternative embodiments of the invention can be used to adjust wheel alignment on straight axle and trailing arm axle vehicles.

32 Claims, 6 Drawing Sheets

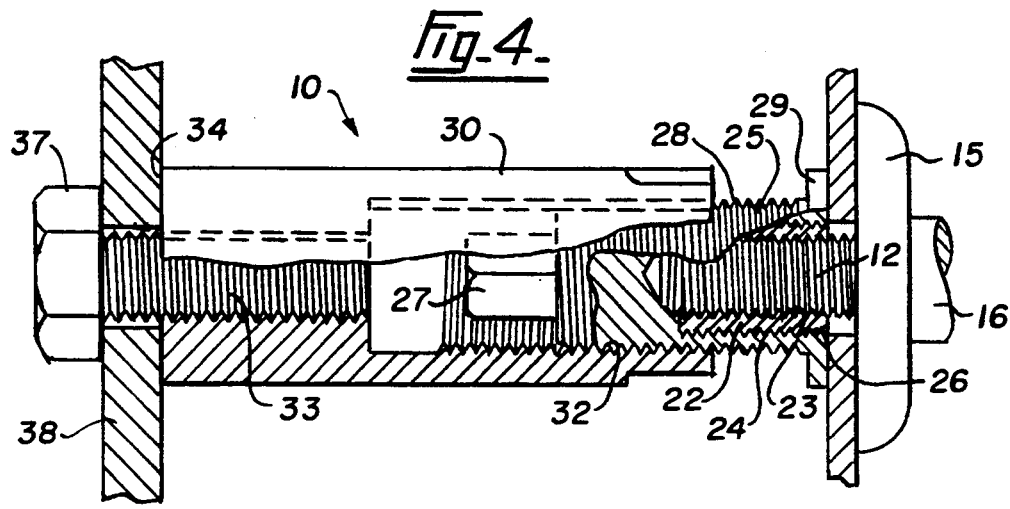
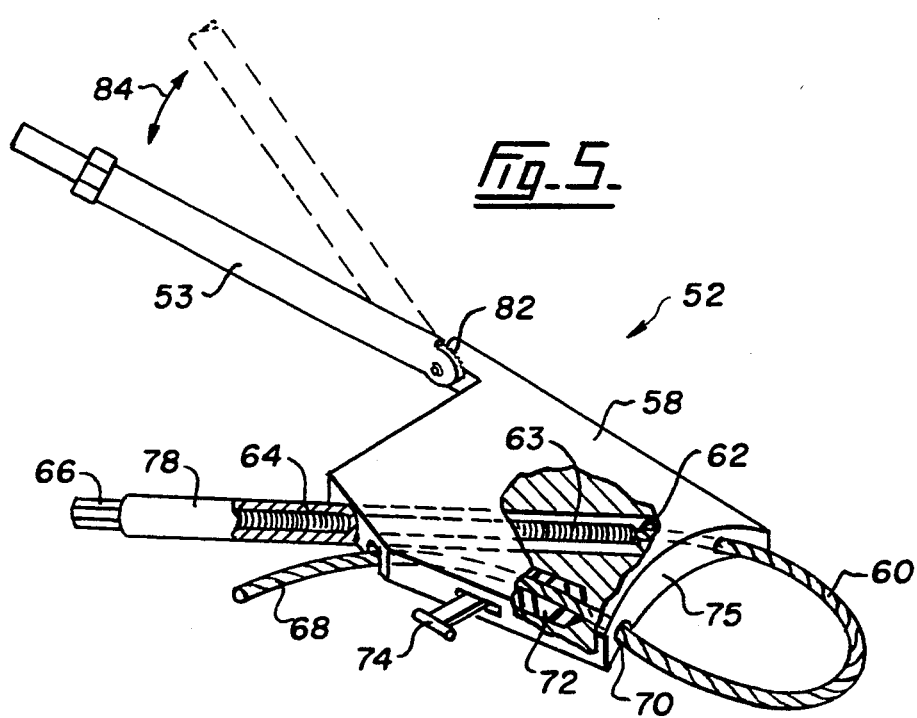
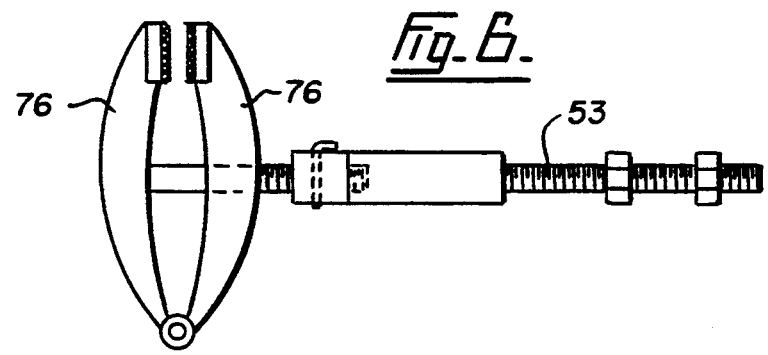

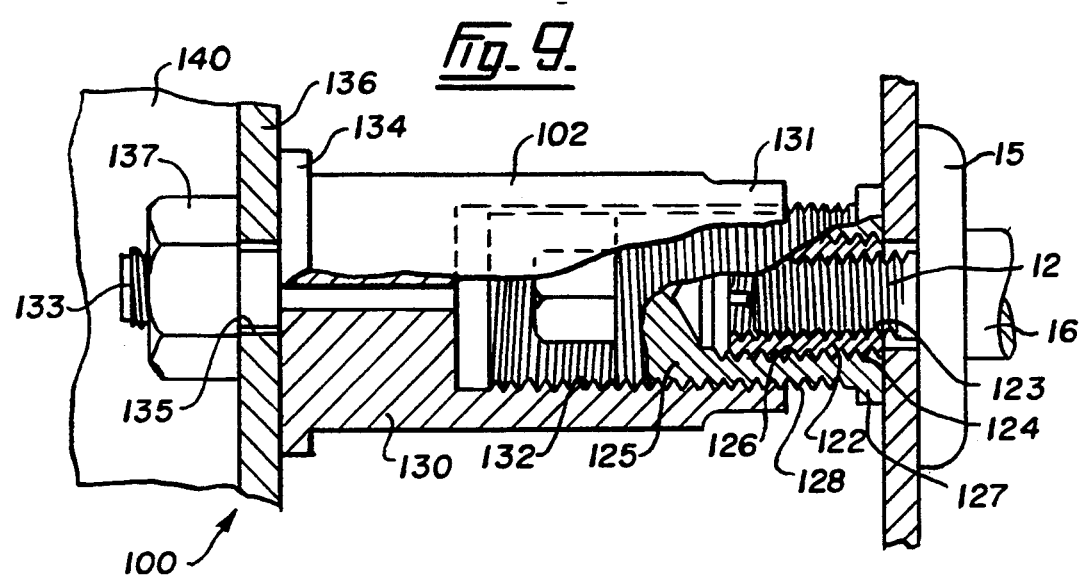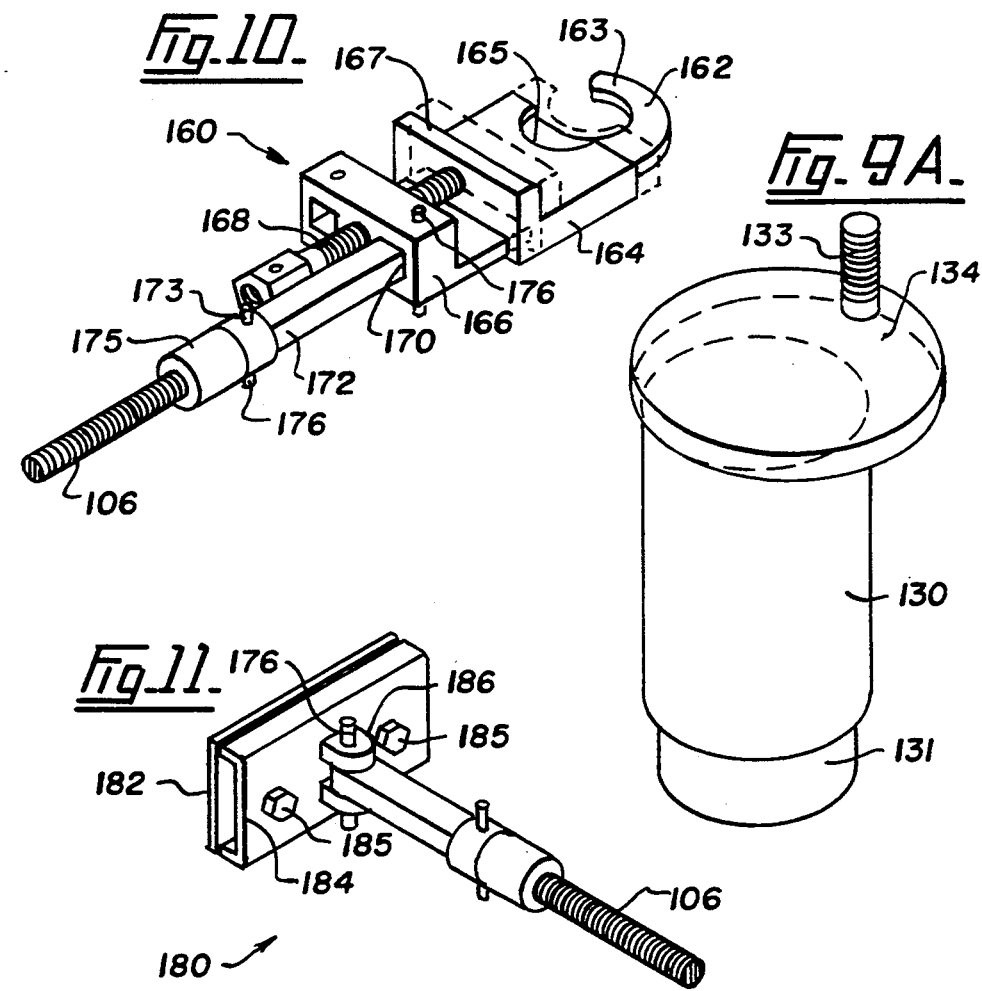

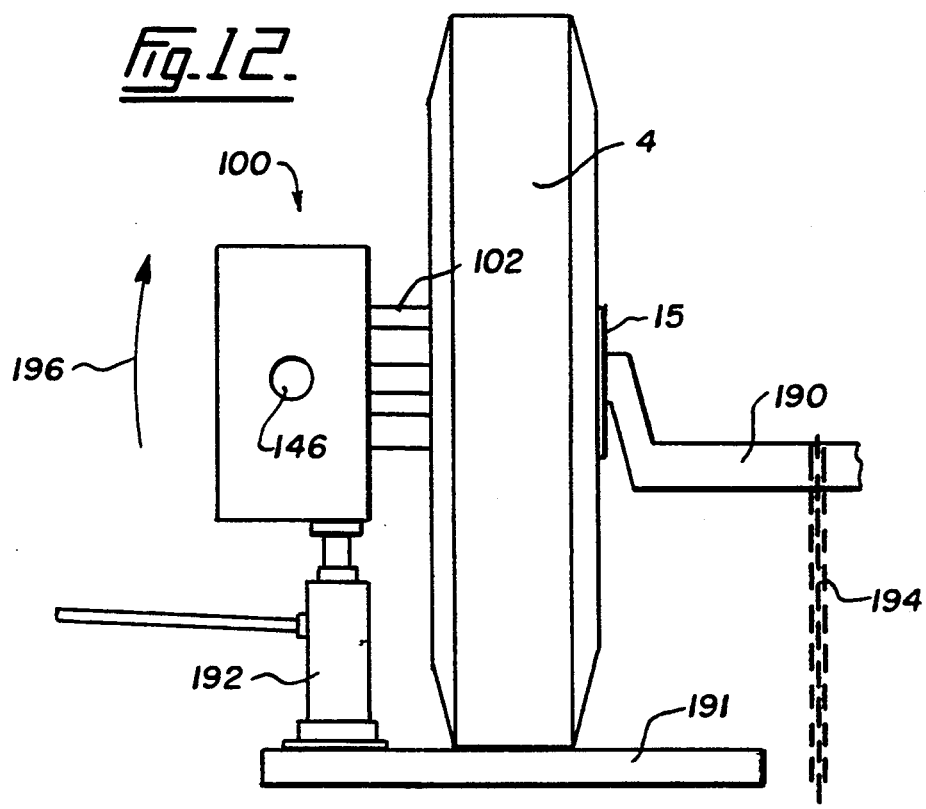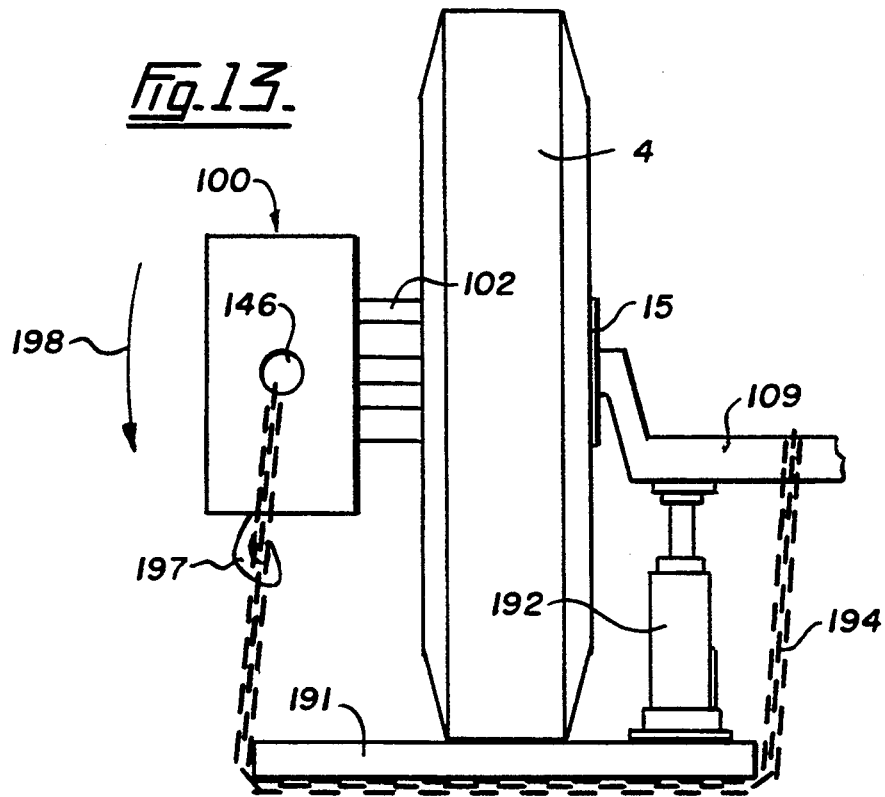

APPARATUS FOR WHEEL ALIGNMENT

CROSS-REFERENCE TO RELATED APPLICATIONS

This application is a continuation-in-part application based on parent application Ser. No. 7/727,267 filed Jun. 26, 1991 now abandoned.

FIELD OF THE INVENTION

This invention relates to an apparatus for aligning wheels on a vehicle while the wheels are in place. The apparatus of the present invention is particularly suited for adjusting four wheel alignment on compact and front wheel drive vehicles with MacPherson strut type front and rear suspensions. The apparatus can be used to correct camber and rear wheel toe-in and can also be used to adjust alignment on trailing axle vehicles.

BACKGROUND OF THE INVENTION

Proper wheel alignment for vehicles is important for safe and reliable handling. In addition, incorrect wheel alignment leads to increased tire wear.

Wheel alignment is most frequently required after a vehicle suffers a major impact in an accident and the suspension member supporting the wheel is bent in some manner. Even a relatively minor occurrence such as hitting a curb or a pot hole can cause some sort of irregularity in the suspension system that leads to wheel misalignment.

Many of today's vehicles employ a strut suspension assembly, such as a MacPherson strut, to connect the wheels to the main body of a vehicle. Currently, there are a number of ways in which a damaged strut can be repaired. The first technique is to replace the damaged parts and straighten the various attachment brackets on the body and hope that the alignment after the work is completed is within the original manufacturer's specifications. Replacement of parts can be expensive with no guarantee that correct alignment will result. Alternatively, shims or other like spacing members can be used in a trial and error process to regain correct wheel alignment. Probably the most popular technique is to employ some type of bending tool to reverse the irregularity in the strut. Many types of bending tools are available for correcting wheel camber adjustment, however, these tools generally involve removing a wheel and installing the tool on the wheel mounting hub. After each trial adjustment, the wheel is replaced and the alignment measured. It is not uncommon to have to repeat this operation several times before proper adjustment is achieved.

Therefore, there exists a need for an apparatus to aid in alignment of vehicle wheels while the wheels are in place on the vehicle.

SUMMARY OF TEE INVENTION

The present invention provides apparatus for vehicle wheel alignment comprising:
a bearing surface rigidly mountable to said wheel;
lever means having a movable fulcrum point mounted to said bearing surface for applying an appropriately directed force to said bearing surface to adjust the alignment of an engaged wheel; and
bracing means extendable from said lever means for attachment to an anchor surface, said bracing means providing a reaction force to ensure that the aligning force generated by said lever means is directed toward said engaged wheel.

In a further aspect, the present invention provides apparatus for adjusting wheel alignment in a vehicle suspension system comprising:
a bearing surface;
means for mounting the bearing surface to the wheel in place on the suspension system of the vehicle;
lever means slidably mountable to the bearing surface;
force exerting means connectable between the lever means and an anchor surface for applying a force to the bearing surface to vary the alignment of the wheel.

In a still further aspect, the present invention provides apparatus for adjusting wheel alignment in a vehicle suspension system that includes a rigid axle comprising:
a bearing surface;
means for mounting the bearing surface to the wheel while in place on the suspension system of the vehicle; and
force exerting means in combination with bracing means extending between the vehicle axle and an anchor point for generating a force at the bearing surface to vary the alignment of the wheel.

The various embodiments of the apparatus of the present invention provide a wheel aligning device that can be used to re-align a wheel while in place on a vehicle. The apparatus of the present invention is particularly useful for adjusting camber misalignment caused by irregularities in the wheel supporting strut in MacPherson strut type suspension systems. Rear wheel toe-in is also easily adjustable with the device of the present invention. The apparatus can also be used to adjust alignment on vehicles equipped with straight and trailing axles.

BRIEF DESCRIPTION OF THE DRAWINGS

Aspects of the present invention are illustrated, merely by way of example, in the accompanying drawings in which:

FIG. 4 is a partial section view showing a detail of the wheel engaging means of the first embodiment;

FIG. 5 is a detail view with broken away sections showing a strut engaging member for the bracing means of the first embodiment;

FIG. 6 is a detail view showing a clamping member for use with the first embodiment for clamping a vehicle sill when the apparatus is configured for rear wheel toe-in adjustment as illustrated in FIG. 3;

FIG. 9 is a detailed view with cutaway sections showing the extension members of the second embodiment;

FIG. 9A is a detailed view of the third bearing plate engaging member of the second embodiment having an offset threaded extension;

FIG. 10 is a detailed view showing a strut engaging member for use with the second embodiment;

FIG. 11 is a detailed view showing a clamping member for use with the second embodiment for clamping a vehicle sill when performing a toe-in adjustment;

FIG. 12 shows a third embodiment of the present invention useful for adjusting wheel alignment of a straight or trailing arm axle vehicle in position to apply a counterclockwise torque; and FIG. 13 shows the third embodiment in position to apply a clockwise torque to the wheel.

DESCRIPTION OF THE PREFERRED EMBODIMENTS

Figure 1:
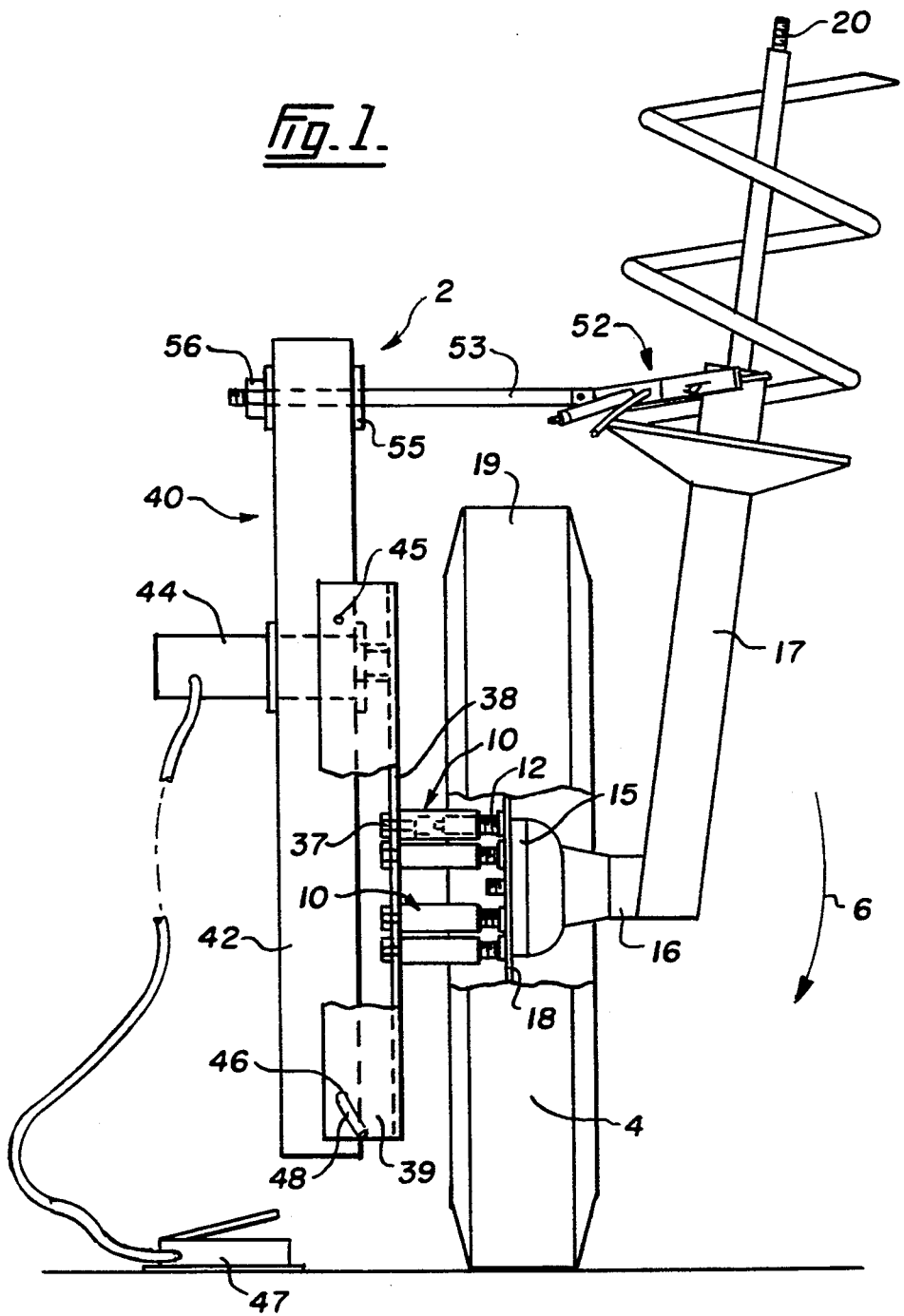
FIG. 1 is a pictorial view showing a first embodiment of the present invention set up to exert a negative or clockwise torque on the attached wheel and suspension strut.
Figure 2:
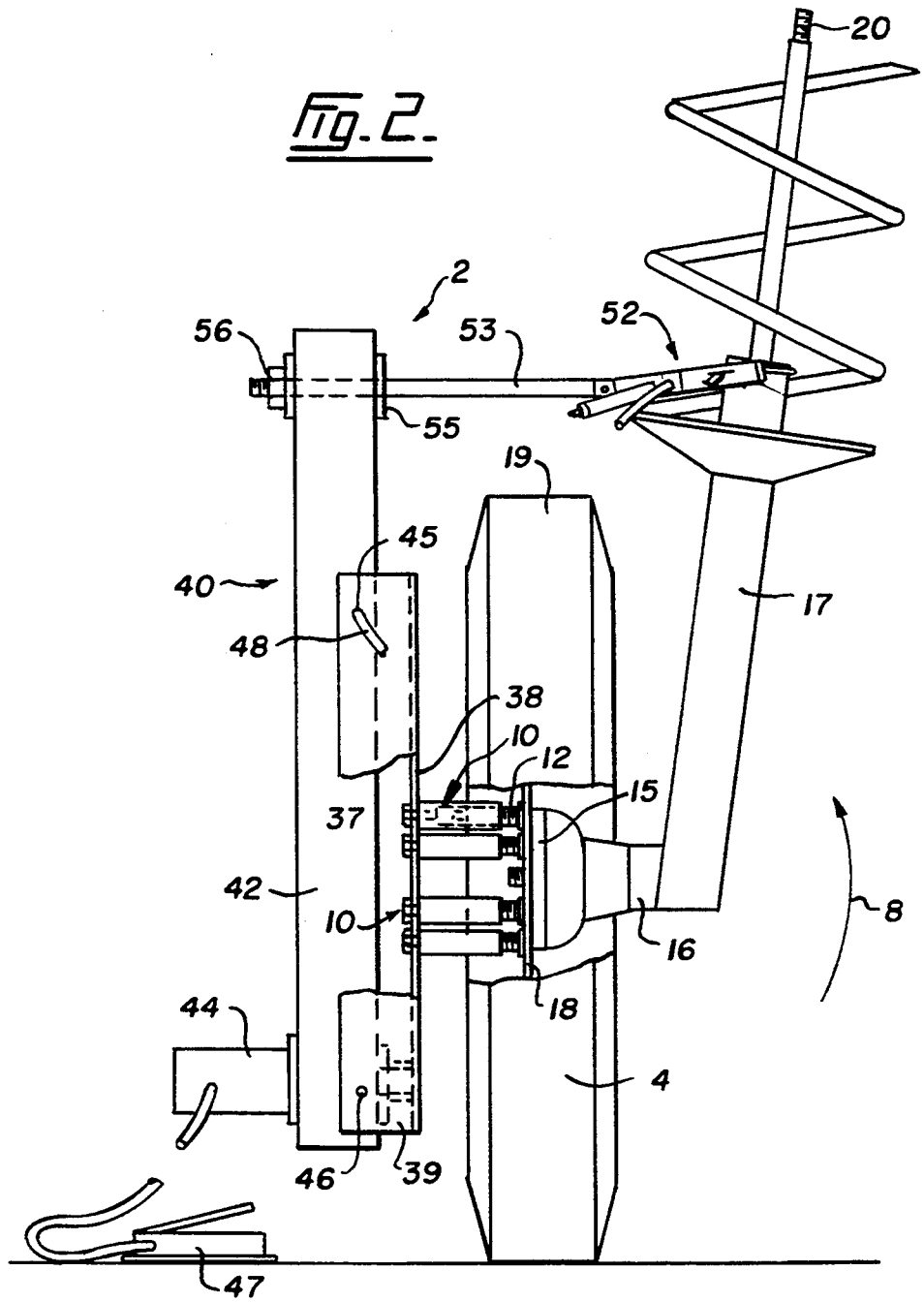
FIG. 2 is a pictorial view similar to FIG. 1 in which the invention is set up to exert a positive or counter-clockwise torque.
Figure 3:
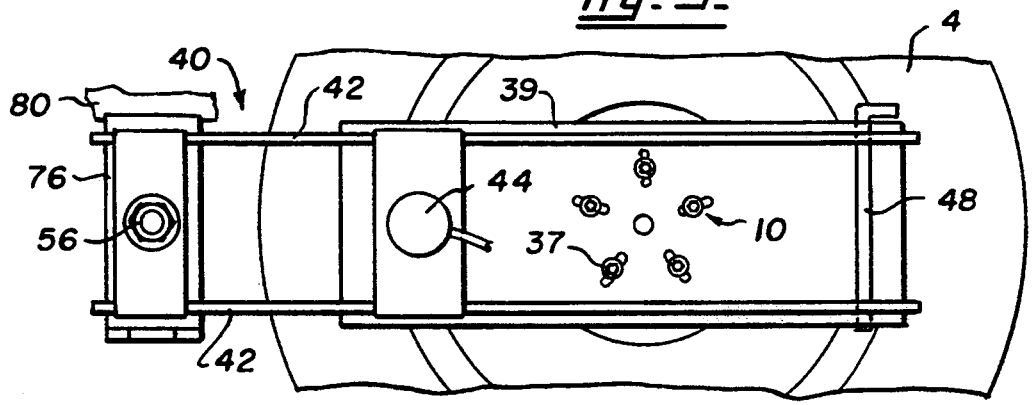
FIG. 3 is a pictorial view in which the apparatus of the first embodiment is set up to perform a rear wheel toe-in adjustment.

FIGS. 1, 2 and 3 illustrate a first embodiment of a wheel aligning apparatus 2 according to the present invention in place on a vehicle wheel 4 requiring alignment. In both FIGS. 1 and 2, the apparatus is set up to perform a camber adjustment of the wheel, however, in FIG. 1, the apparatus is set up to exert a clockwise torque as indicated by arrow 6, and in FIG. 2, the apparatus is set up to exert a counterclockwise torque as indicated by arrow 8. In FIG. 3, the apparatus is set up to perform a toe-in adjustment of a rear wheel.

The apparatus for vehicle wheel alignment preferably includes wheel engaging means comprising a plurality of threaded extensions 10 to engage the etude 12 of the wheel to be aligned.

FIG. 4 provides a detailed view of the threaded extensions 10. Each stud accepts a threaded extension 10. Studs 12 extend from the wheel hub 15 which is rotatably supported on axle 16 mounted to a conventional MacPherson strut assembly 17. Strut assembly 17 is mounted at 20 to the body of a vehicle. Normally studs 12 accept wheels nuts (not shown) that hold a wheel rim 18 and mounted tire 19 onto hub 15.

With the apparatus of the present embodiment, the wheel nuts are removed so that studs 12 can accept the threaded extensions 10. Normally, all nuts but one are removed and the extensions tightened into place on the exposed studs. The remaining nut which acts to hold the wheel in place is then replaced by an extension. Each extension is made up of a number of threaded members. Each extension includes a first insert member 22 having internal threads 23 to engage an associated wheel stud 12 and external threads 24. Each first insert member 22 is preferably dimensioned to thread onto a stud 12 such that the inner end of member 22 extends past the wheel rim 15. The insert members act to lengthen each stud for easy attachment of further threaded members, and also to strengthen the etude to withstand the bending forces exerting by the aligning apparatus. Preferably, inserts 22 are provided with a slotted head to allow for threading onto studs with a screw driver.

There is a second wheel retaining member 25 having internal threads 26 to engage external threads 24 of insert members 22. Wheel retaining member 25 has a terminal flange 26 to engage against wheel rim 18 and ensure that the rim is firmly held against wheel hub 15 when the retaining member is firmly tightened onto insert 22. Retaining member 25 is provided with an integral nut 27 on its top end to permit tightening using conventional socket tools.

Retaining member 25 is formed with external threads 28 to accept a third extension member 30 having corresponding internal threads 32. Internal threads 32 are formed in a cavity dimensioned to accommodate nut 27 atop retaining member 25. There is a threaded aperture 33 formed in the top surface 34 of extension member 30 to accept a fastener 37 to locate a bearing surface 38 against the extension member 30.

Referring to FIGS. 1 and 2, threaded extensions 10 act to effectively extend the length of wheel studs 12 so that bearing surface 38 can be rigidly mounted to the wheel 4 to be aligned. Bearing surface is preferably a planar surface having a pattern of holes extending therethrough to accept the fasteners 37 of extension members 10. As best shown in FIG. 3, the holes are oblong to accommodate wheels having different diameters bolt patterns. In the illustrated embodiment, the planar surface has raised side edges 39.

Lever means 40 are mountable to bearing surface 38 between side edges 39. Lever means 40 includes a pair of spaced, parallel elongate members 42 pivotally mountable to the bearing surface between side edges 39 by pin 48 insertable through aligned apertures 45 or 46 formed in the elongate members 42 and the side edges. The pivotal connection between elongate members 42 and the bearing plate serves as a fulcrum point for the lever means. Lever means 40 also includes means for applying a force to bearing surface 38 in the form of a hydraulic cylinder 44 mounted to elongate member 42 for slidable movement along the member. Hydraulic cylinder 44 can be operated by a foot valve 47. Hydraulic cylinder 44 is mounted between elongate members 42 for slidable movement. Hydraulic cylinder is moved between the members and positioned at a desired location to apply an aligning force to said bearing surface.

Elongate members 42 of lever means 40 and side edges 39 of bearing surface 38 are formed with holes 45 and 46 that accept a pin member 48 to connect the parts of the apparatus together. Holes 45 and 46 can both have a pin inserted therein to lock the position of the lever means with respect to the bearing surface when adjusting the position of hydraulic cylinder 44. Alternatively, if only one set of holes 45 or 46 has a pin inserted, the pin defines a fulcrum point about which elongate member 42 pivots.

The apparatus of the first embodiment also employs bracing means extendable between elongate member 42 and an anchor surface in order to stabilize the apparatus. The bracing means provides a reaction force to ensure that the aligning force exerted by hydraulic ram 44 is directed toward the engaged wheel to be aligned.

Several alternative bracing means can be used. As shown in FIGS. 1, 2 and 5, the anchor surface can be suspension strut 17 of the vehicle and the bracing means can comprise a strut engaging member 52 and a rigid connecting member 53 interconnecting the strut engaging member and elongate member 42 of the lever means. Rigid connecting member 53 is connected between elongate members 42 by a spanning member 55 extending between spaced, paired elongate members 42. Spanning member 55 can be clamped in place with respect to elongate members 42 and nut 56 tightened to firmly secure connecting member 53 to elongate members 42.

As best shown in FIG. 5, strut engaging member 52 comprises a housing 58 pivotally connected to rigid connecting member 53 to allow for adjustable attachment of the housing to a strut suspension member. Rigid connecting member 53 is lockable into place with respect to housing 58. For example, pivoting releasable lock 82 can be used to adjustably position the angle of the housing with respect to connecting member 53 as indicated by arrow 84. Such an arrangement allows for housing 58 to be attached to a strut at an appropriate location and still ensure that member 53 extends essentially perpendicularly from spanning member 55°

A flexible cable 60 extends from housing 58. Cable 60 has an anchored end 62 that is attached to a threaded rod 63 mounted within a correspondingly threaded passage 64 extending into housing 58. Rotation of threaded rod 63 by rotating exposed nut 66 acts to loosen or tighten cable 60 when wrapped about a strut member.

Cable 60 also has a free end 68 extending outwardly from the housing to allow the cable to be easily looped about a strut member. After looping the cable about a strut, the cable is inserted into slot 70 and locking means 72 is engaged to clamp the cable tightly into place. Locking means 72 is preferably a conventional locking clamp that can be operated by release lever 74. Once release lever is moved to the locked position, nut 66 can be rotated for fine adjustment of the tightening grip.

Note that the housing of FIG. 5 is relatively thin to make positioning of the housing within the springs of a suspension strut relatively easy. The apparatus of the first embodiment is used with the vehicle wheels in place such that the suspension is fully supporting the vehicle weight. This results in the suspension springs being compressed leaving little room for insertion of housing 58 between the spring coils. In addition, front face 75 is a curved surface to engage the rounded surface of a strut suspension arm 17. For ease of accessibility, adjustment nut 66 is mounted at the end of an extension shaft 78.

It is intended that strut engaging member 52 be positioned on a strut in order to stabilize the strut. In this regard, it is desirable that the strut engaging member be positioned on the strut as close to bending or twist in the strut as possible to ensure that any realigning bending or twisting is limited to essentially the same location.

As illustrated in FIGS. 1 and 2, the bracing means employing strut engaging member 52 is suitable for camber adjustment of a wheel.

An alternative set up to allow for toe-in alignment is illustrated in FIGS. 3. Alternative bracing means for use with the set up of FIG. 3 are shown in FIG. 5. In this case, the engaging member comprises a pair of clamping arms 76 mounted to the end of a rigid connecting rod 53. Clamping arms 76 are adapted to engage a pinch weld seam 80 on the undersurface of the vehicle that will serve as an anchor surface. In order to use the apparatus of the first embodiment to perform toe-in adjustments, the entire apparatus is rotated through essentially 90 degrees such that elongate members 42 are horizontal rather than vertical. In its horizontal orientation, clamping arms 76 are positioned under the body of the car to grip an appropriate sill seam in order to stabilize the apparatus.

The manner in which the apparatus of the first embodiment operates is best illustrated in FIGS. 1 and 2. Both FIGS. 1 and 2 show the apparatus set up to perform a camber adjustment of a wheel. In FIG. 1, hydraulic cylinder 44 has been moved upwardly and positioned adjacent aperture 45. When moving the hydraulic cylinder, pins 48 would be inserted in to both apertures 45 and 46 to allow for convenient movement of the cylinder. The operator determines where the hydraulic cylinder should be positioned in order to apply an appropriately directed force to perform the desired alignment of the wheel. The pin closest to the hydraulic cylinder is then removed with the result that the remaining pin becomes the fulcrum point about which elongate member 42 pivots in order to apply the desired aligning force. In FIG. 1, the pin in aperture 45 is removed, and, when hydraulic cylinder 44 is activated, a clockwise moment, indicated by arrow 6 is exerted on the wheel and suspension strut. This moment is created by cylinder 44 exerting a force against bearing surface 38 which is free to pivot about pin 48 in aperture 46.

In FIG. 2, hydraulic cylinder 42 is moved downwardly and fixed in position adjacent aperture 46. The pin in aperture 46 is removed and the pin is aperture 45 defines an upper fulcrum point. When hydraulic cylinder 42 is activated, a counter-clockwise moment is force 8 exerted on the wheel and strut.

Figure 7:
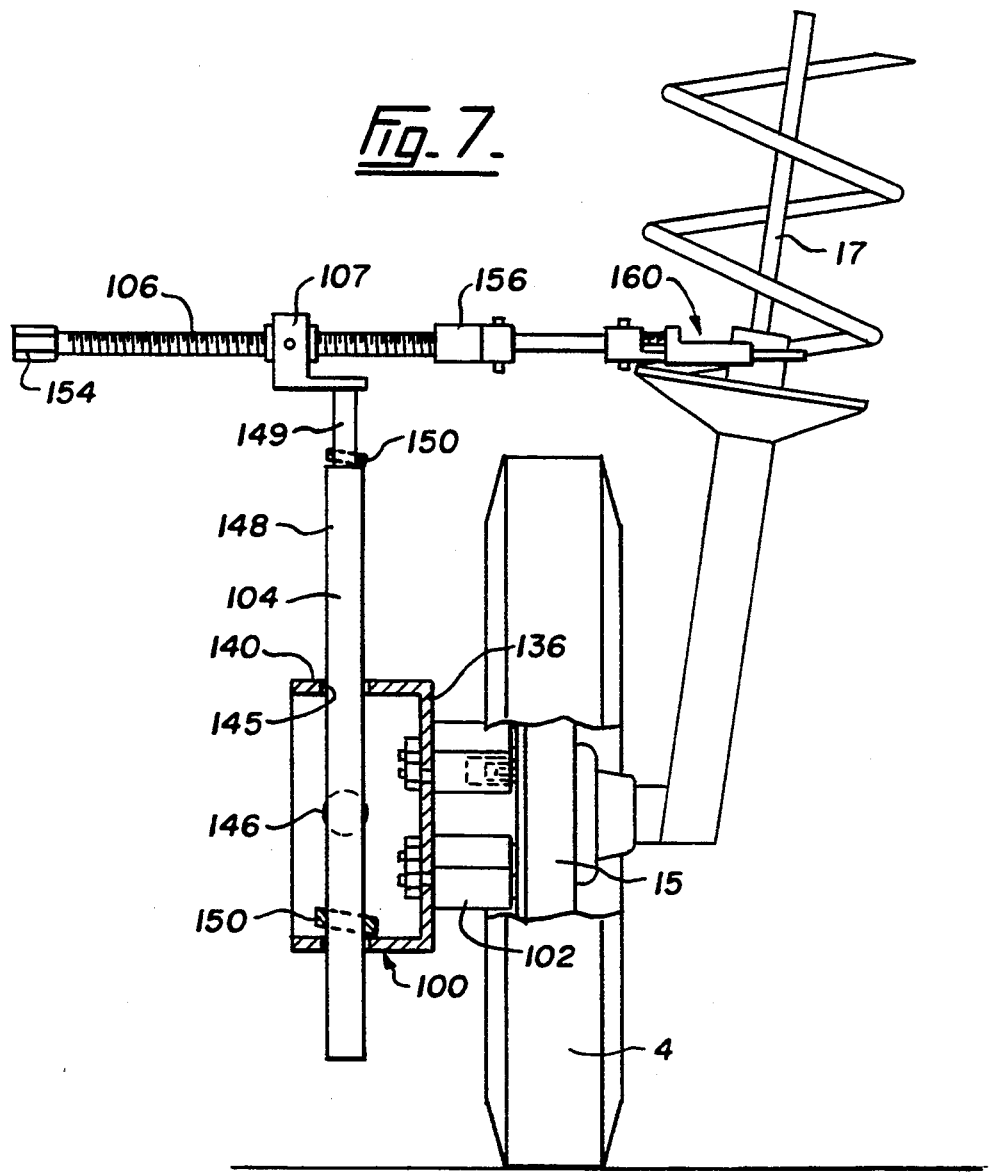
FIG. 7 is a pictorial view showing a second embodiment of the present invention in place on a vehicle suspension system.

A second embodiment of the present invention is illustrated in FIGS. 7 to 11. The apparatus of the second embodiment is similar to the first embodiment. As best shown in FIG. 7, there is a bearing surface in the form of a drum member 100 attached to a plurality of extensions 102 mounted on the etude of a wheel hub 15 while the wheel is in place on the etude. Lever means in the form of elongate member 104 are provided to support a force exerting member comprising screw shaft 106 that engages strut assembly 17 and acts to exert a force on drum member 100 to vary the alignment of the wheel by bending the strut assembly in a controlled manner.

Each extension 102, shown in cutaway detail in FIG. 9, comprises a plurality of members that cooperate to engage the stud 12 of the wheel and connect the drum member 100 to the wheel at a distance to create a lever arm for applying a bending force to vary the alignment of the wheel.

As in the first embodiment, each extension 102 includes three co-operating parts. There is a first stud extension member 122 having internal threads 123 to engage the wheel stud 12 and external threads 124. Extension member 122 extends the wheel stud and strengthens the stud to withstand bending forces. A second wheel retaining member 125 has internal threads 126 to engage external threads 124 of the first stud extension member. Second wheel retaining member 125 also has external threads 128 and a flange 127 to engage against the wheel and secure the wheel on the hub 15.

There is a third bearing plate engaging member 130 having internal threads 132 to engage external threads 128 of second wheel retaining member 125. As best shown in FIG. 9A, member 130 is a substantially cylindrical body having an enlarged flat top surface 134. There is an offset threaded post 133 extending from top surface 134. A clearance step 131 is provided at the base of the body. Threaded posts 133 extend through apertures 135 formed in the base 136 of drum member 100 to permit releasable connection of the drum member 100 to the assembled threaded extensions when nuts 137 are tightened into place on posts 133.

An important feature of the third bearing plate member 130 is that post 133 extends from the member in an orientation parallel to but offset from the longitudinal axis of the member. Therefore, rotation of member 130 on threads 128 permits the angular position of post 133 about the longitudinal axis to be varied. Member 130 is not tightened onto threads 128 such that surface 131 engages against the wheel to stop rotational movement, rather member 130 is freely rotatable on threads 128 of second wheel retaining member 125, the only requirement being that sufficient threads are engaged to ensure that member 130 is reliably positioned on the second wheel retaining member.

Figure 8:
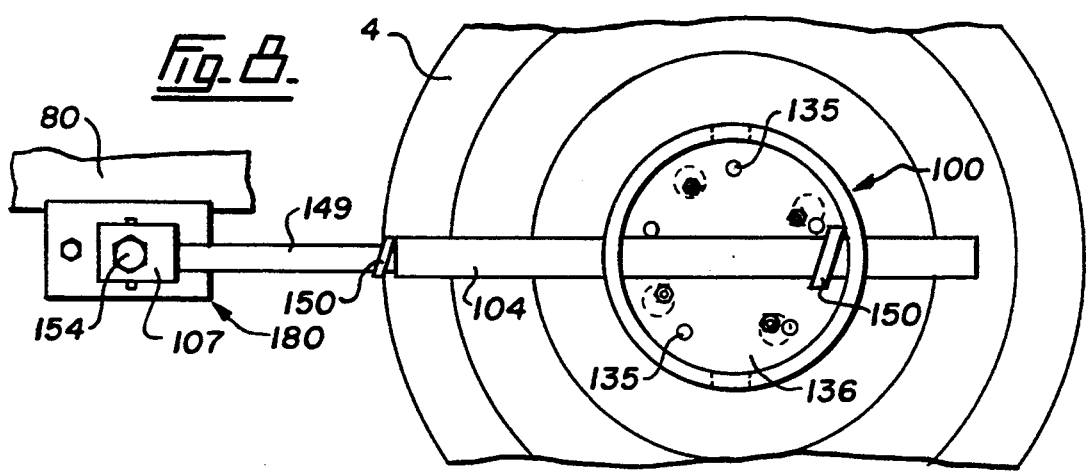
FIG. 8 shows the apparatus of the second embodiment set up to perform a toe-in adjustment.

Drum member 100 comprises a circular base 136 inserted within a short hollow tube that defines the side edges 140 of the member. Circular base 136 is preferably threadably received within the tube to permit rotation of the base. Base 136 is formed with a plurality of apertures 135 therethrough. As best shown in FIG. 8, there are preferably 8 apertures in base 136 arranged to accommodate various 4 and 5 stud wheel patterns and diameters. The plurality of apertures 135, the offset positioning of posts 133, the ability to rotate poets 133 to vary their angular position and the ability to rotate base 136 permit the apparatus of the second embodiment to be virtually infinitely adjustable with respect to accommodating any stud pattern on a wheel.

Referring to FIG. 7, side edges 140 of drum member 100 are typically formed with two pairs of aligned diametrically opposed apertures 145 and 146, respectively, arranged at ninety degrees to each other. Apertures 145 slidably accept elongate member 104 which supports screw thread 106. As illustrated, elongate member 104 is preferably formed from a pair of telescoping portions 148 and 149. Locking means in the form of annular locking ring 150 are provided for releasably locking the telescoping portions with respect to each other and with respect to the drum member 100. Annular locking rings 150 have parallel upper and lower surfaces that are at other than right angles to the axis of the ring. When such a ring is positioned about a cylindrical telescoping portion and is brought into contact with a fixed surface, such as a side edge 140 or the end of a telescoping section, the ring will tend to engage against the cylindrical portion and lock the portion in place with respect to the fixed surface.

Locking rings 150 permit telescoping elongate member 104 to be positioned such that attached screw shaft 106 is aligned with a suspension strut assembly 17. Screw shaft 106 is rotatably received in threaded housing 107 mounted atop the telescoping portion 149. Screw shaft 106 has a first end 154 for attachment to a driving tool and a second end 156 connectable to a strut assembly.

Second end 156 is connectable to a strut assembly via a grasping member 160 best shown in FIG. 10. Grasping member 160 comprises a first portion 162 having a hook member 163 extending therefrom. A second clamping portion 164 having a semi-circular bearing surface 165 that is mounted to first portion 162 for slidable movement. Clamping portion 164 and hook member 163 cooperate to define a variably sizable clamping cavity for engaging about the strut member. It will be understood that grasping member 160 is dimensioned such that it is sufficiently thin to fit between the suspension coils of a strut arm spring when the spring is compressed by the weight of the vehicle.

First portion 162 is formed with an upstanding flange 166 and clamping portion 164 has a corresponding flange 167. A threaded shaft 168 is threadably received in flange 166 and extends therethrough for rotatable attachment to flange 167. When shaft 168 is rotated clamping portion 164 is moved relative to first portion 162.

Flange 166 is formed with an attachment point comprising at least one cavity 170 for releasably connecting grasping member 160 to screw shaft 106. A connecting member 172 extends from cavity 170 and a corresponding cavity 173 formed in cylindrical housing 175 at the second end of screw shaft 106. Pins 176 releasably lock the connecting member in cavities 170 and 173 to join grasping member 160 to screw shaft 106.

In use, a driving tool such as a powered torque wrench can be applied to first end 154 to rotate screw shaft 106 within housing 107 to apply a clockwise or counterclockwise torque to the wheel to be aligned through drum member 100.

In a similar manner to the first embodiment, FIG. 8 shows how the apparatus of the present embodiment can be rotated through 90 degrees to vary toe-in adjustment of a wheel. In this arrangement, elongate member 104 arranged horizontally and is extended and positioned to permit alignment of screw shaft 106 with a lower body sill 80 of a vehicle. Screw shaft 106 is releasably connected to a clamping member 180 for gripping the sill 80.

As best shown in FIG. 11, clamping member 180 comprises a pair of opposed plates 182 and 184 connected by threaded shafts 185 to permit movement together and apart in order to grip the sill. There is also an attachment point 186 for releasably connecting the clamping member to screw shaft 106 using a locking pin 176 in a manner identical to the scheme for attaching screw shaft 106 to grasping member 160.

FIGS. 12 and 13 illustrate a third embodiment of the present invention particularly suited for adjustment of wheel camber on straight axle and trailing arm axle vehicles that do not have a suspension strut member to brace against.

FIGS. 12 and 13 schematically show the essential components of a straight axle vehicle comprising a wheel 4 rotatably mounted to a hub 15 that is carried by a solid axle 190. The vehicle is preferably supported on a conventional four wheel alignment machine that includes the support surface 191.

The third embodiment of the present invention uses some of the components of the second embodiment including drum member 100 and extension members 102 for mounting member 100 to the wheel of a vehicle in the manner previously described.

Force exerting means in the form of jack 192 and bracing means in the form of chain 194 are included in the apparatus of the third embodiment. The jack and chain co-operate to generate a force at the bearing surface to vary the alignment of the wheel. For example, the arrangement of FIG. 12 generates a force, indicated by arrow 196, that tends to vary the camber adjustment of wheel 4 in a clockwise direction and the arrangement of FIG. 13 generates a force indicated by arrow 198 that tends to vary the camber adjustment of wheel 4 in a counterclockwise direction.

Referring to FIG. 12, jack 192 is positioned beneath drum member 100 and chain 194 is looped about axle 190 and secured to an anchor point (not shown). As the jack is extended, chain 194 holds the axle and the vehicle down so that the force of jack 192 is used to exert a counterclockwise force on wheel 4 to adjust the camber of the wheel.

Referring to FIG. 13, chain 194 is looped about axle 190 and under support surface 191 to the other side of the wheel. At the other side of the wheel, the chain is inserted through holes 146 in drum member 100. Chain 194 is preferably provided with a terminal hook 197 that is hooked about the chain to anchor the chain to member 100. Jack 192 is positioned under axle 190 at a location between the wheel and the chain. When jack 192 is extended chain 194 tends to pull on member 100 to exert a counterclockwise force to adjust the camber of the wheel.

The various embodiments of the present invention are best used in conjunction with a conventional four wheel alignment machine that has rotatable pads under each wheel to permit free rotation of a wheel as it is realigned. The present invention allows for quick, reliable adjustment of wheel alignment on the first attempt. Any correction of wheel alignment is done with all wheels on the vehicle and the vehicle sitting at standard curb height. A conventional alignment measuring gauge can be used to directly monitor the alignment as it is corrected by the tool of the present apparatus. It is not necessary to undertake the trial and error adjustment process common to equipment presently in use.

Additional advantages of the apparatus of the present invention include the ability to align wheels without jacking the vehicle. The apparatus is also highly adjustable to allow for very accurate alignment of a wheel. Varying the position of hydraulic cylinder 42 above bearing surface 38 allows a skilled operator to accurately apply the desired aligning force.

Although the present invention has been described in some detail by way of example for purposes of clarity and understanding, it will be apparent that certain changes and modifications may be practised within the scope of the appended claims.

I claim:

1. Apparatus for vehicle wheel alignment comprising:
   a bearing surface;
   means for mounting the bearing surface to the wheel comprising one or more threaded extensions to engage one or more studs of the wheel and removably secure the bearing surface to the wheel at a distance from the wheel to create a lever arm for applying a bending force said one or more threaded extensions positioned between the bearing surface and the wheel;
   lever means having a movable fulcrum point mountable to said bearing surface for applying an appropriately directed force to said bearing surface to adjust the alignment of an engaged wheel; and
   bracing means extendable from said lever means for attachment to an anchor surface, said bracing means providing a reaction force to ensure that the aligning force generated by said lever means is directed toward said engaged wheel.

2. Apparatus as claimed in claim 1 in which said lever means comprises:
   an elongate member pivotably mountable to said bearing surface to define a fulcrum point;
   means for applying a force to said bearing surface mounted to said elongate member and slidable along said member for positioning at a fixed location when applying an aligning force to said bearing surface.

3. Apparatus as claimed in claim 2 in which said means for applying a force to said bearing surface comprises a hydraulic cylinder.

4. Apparatus as claimed in claim 2 in which said elongate member comprises a pair of spaced, parallel members and said means for applying a force to said bearing surface is mounted for slidable movement between said spaced, parallel members.

5. Apparatus as claimed in claim i including alignable holes formed in said bearing surface and said lever means and a pin member insertable through a pair of said alignable holes to define a fulcrum point for said lever means.

6. Apparatus as claimed in claim I in which said anchor surface is a body panel sill of the vehicle and said bracing means comprises a clamping member to grip and engage said sill, and a rigid connecting member interconnecting said clamping member and said lever means.

7. Apparatus as claimed in claim I in which said anchor surface is a suspension strut of the vehicle and said bracing means comprises a strut engaging member and a rigid connecting member interconnecting said strut engaging member and said lever means.

8. Apparatus as claimed in claim 7 in which said strut engaging member comprises:
   a housing pivotally connected to said rigid connecting member;
   a flexible cable held in said housing at an anchored end and having a free end extending outwardly from said housing for looping about a strut member; and
   locking means in said housing for engaging and holding said free end of cable when looped about a strut member in order to clamp said cable about said strut member.

9. Apparatus as claimed in claim 8 including cable tightening means in said housing comprising a threaded passage in said housing and a threaded rod attached to said anchored end of said cable received in said passage whereby rotation of said threaded rod acts to loosen or tighten said cable when wrapped about a strut member.

10. Apparatus as claim in claim 1 in which said one or more threaded extensions comprises:
   a first insert member having internal threads to engage said wheel studs and external threads;
   a second wheel retaining member having internal threads to engage the external threads of said first stud member and external threads;
   a third extension member having internal threads to engage the external threads of said second wheel retaining member and a threaded aperture to accept fastening means to releasably attach said bearing surface to said third extension member.

11. Apparatus as claimed in claim 1 in which said bearing surface comprises a plate having a central flat surface with opposed, parallel upturned side edges to define a channel to accept said lever means.

12. Apparatus as claimed in claim 11 in which said central flat surface is formed with a pattern of apertures extending therethrough to accept fasteners for attaching said bearing surface to said wheel.

13. Apparatus for adjusting wheel alignment in a vehicle suspension system comprising:
   a bearing surface;
   means for mounting the bearing surface to the wheel comprising one or more extension members to engage one or more studs of the wheel and removably secure the bearing surface to the wheel at a distance from the wheel to create a lever arm for applying a bending force;
   lever means mountable to the bearing surface;
   force exerting means connectable between the lever means and an anchor surface for applying a force to the bearing surface to vary the alignment of the wheel.

14. Apparatus as claimed in claim 13 in which each extension member includes three co-operating parts and comprises:
   a first stud extension member having internal threads to engage the wheel studs and external threads;
   a second wheel retaining member having internal threads to engage the external threads of the first stud extension ember, external threads and a flange to engage against the wheel and secure the wheel on the stud; and
   a third bearing plate engaging member having internal threads to engage the external threads of said second wheel retaining member and a threaded post for releasable connection with the bearing plate.

15. Apparatus as claimed in claim 14 in which said third bearing plate engaging member comprises a substantially cylindrical body having an longitudinal axis, the threaded post extending from the member in an orientation parallel to but offset from the longitudinal axis such that rotation of the member permits the angular position of the post about the longitudinal axis to be varied to permit alignment of the threaded posts with associated apertures in the bearing member such that any wheel stud pattern can be accommodated.

16. Apparatus as claimed in claim 13 in which the bearing plate comprises a planar surface formed with upturned side edges, the side edges being formed with at least one pair of aligned apertures to accept the lever means and the planar surface having apertures formed therethrough to permit attachment of the base to the means for mounting the bearing plate.

17. Apparatus as claimed in claim 16 in which the bearing plate comprises a drum member having a tubular portion defining the side edges and a circular base.

18. Apparatus as claimed in claim 17 in which the circular base is threadably received within the tubular portion to permit rotation of the base.

19. Apparatus as claimed in claim 13 in which said lever means comprises an elongate member.

20. Apparatus as claimed in claim 19 in which the elongate member is formed from a pair of telescoping portions.

21. Apparatus as claimed in claim 19 including locking means for releasably locking the telescoping portions with respect to each other and with respect to the bearing plate.

22. Apparatus as claimed in claim 21 in which the locking means comprises an annular locking ring having parallel upper and lower surfaces that are at other than right angles to the axis of the ring, the ring being positionable about a portion of the elongate member.

23. Apparatus as claimed in claim 13 in which the force exerting means comprises a screw shaft.

24. Apparatus as claimed in claim 23 in which the screw shaft comprises a threaded housing pivotally mounted atop the lever means and a threaded shaft received in the threaded housing having a first end for attachment to a driving tool and a second end connectable to an anchor surface.

25. Apparatus as claimed in claim 24 in which the anchor surface is a suspension system strut and the second end of the threaded shaft is connectable to a grasping member for gripping the strut.

26. Apparatus as claimed in claim 25 in which the grasping member comprises:
   a first portion having a hook member extending therefrom;
   a second clamping portion having a semi-circular bearing surface that is slidable with respect to the first portion and that co-operates with the hook member to define a variably sizable clamping cavity for engaging about the strut member; and
   an attachment point for releasably connecting the grasping member to the threaded shaft.

27. Apparatus as claimed in claim 26 in which the anchor surface is a body panel sill of the vehicle and the second end of the screw thread is connected to a clamping member for gripping the sill.

28. Apparatus as claimed in claim 27 in which the clamping member comprises a pair of opposed plates connected by threaded shafts to permit movement together and apart and an attachment point for releasably connecting the clamping member to the threaded shaft.

29. Apparatus for adjusting wheel alignment in a vehicle suspension system that includes a straight axle comprising:
   a bearing surface;
   means for mounting the bearing surface to the wheel
   force exerting means engageable with the bearing surface for generating a force to vary the alignment of the wheels; and
   bracing means comprising a chain engaged about the axle of the vehicle and connected to an anchor point to restrain movement of the axle while the force exerting means is being operated.

30. Apparatus as claimed in claim 29 in which the force exerting means comprises a jack.

31. Apparatus for adjusting wheel alignment in a vehicle suspension system that includes a straight axle comprising:
   a bearing surface;
   means for mounting the bearing surface to the wheel;
   bracing means comprising a chain connected between the bearing surface as a first anchor point and the axle as a second anchor point; and
   force exerting means engaged against the axle intermediate the first and second anchor points for generating a force against the axle to vary the alignment of the wheel.

32. Apparatus as claimed in claim 31 in which the force exerting means comprises a jack.

* * * * *